United States Patent [19]
Yamaoka et al.

[11] Patent Number: 5,163,660
[45] Date of Patent: Nov. 17, 1992

[54] SENSOR ARRANGEMENT OF VIBRATION ISOLATION APPARATUS

[75] Inventors: Fumiyuki Yamaoka; Shinobu Kakizaki, both of Kanagawa, Japan

[73] Assignee: Atsugi Unisia Corporation, Japan

[21] Appl. No.: 661,007

[22] Filed: Feb. 26, 1991

[30] Foreign Application Priority Data

Feb. 28, 1990 [JP] Japan .................................. 2-48282

[51] Int. Cl.⁵ ........................ F16M 1/00; F16M 7/00; F16M 9/00
[52] U.S. Cl. .................................... 267/136; 267/220
[58] Field of Search ............ 267/222, 141.2, 140.1 R, 267/141, 136, 220, 195, 196, 201, 200, 214, 221, 234, 285, 140.1 C, 140.1 A

[56] References Cited

U.S. PATENT DOCUMENTS 4,756,516  7/1988  Tondato ........................... 267/220
5,040,775  8/1991  Miyakawa ........................ 267/220

*Primary Examiner*—Joseph F. Peters, Jr.
*Assistant Examiner*—Kenneth Lee
*Attorney, Agent, or Firm*—Ronald P. Kananen

[57] ABSTRACT

According to the present invention, a sensor arrangement of a vibration isolation apparatus has a generally annular sensor plate with a plurality of strain sensing elements mounted on a radially extending portion which is elastically deformable upon application of input load. The sensor plate is elastically deformed upon elastic deformation of the radially extending portion.

20 Claims, 7 Drawing Sheets

SENSOR ARRANGEMENT OF VIBRATION ISOLATION APPARATUS

BACKGROUND OF THE INVENTION

The present invention relates to a vibration isolation apparatus and, more particularly, to an arrangement of a sensor in a vibration isolation apparatus.

In order to control transmission of shock or vibration between a sprung member and an unsprung member, there is a need to arrange a load sensor in a vibration isolation apparatus, such as a vehicle suspension unit.

Published Japanese Utility Model Application No. 62-43909 shows an arrangement of a load sensor in a vibration isolation apparatus (see FIG. 10 of this publication). This known vibration isolation apparatus is coupled in a force transmitting relationship between a sprung member in the form of a vehicle axle and an unsprung member in the form of a vehicle body, and includes as a suspension member a piston rod having a lower end inserted into a cylinder and an upper end inserted through an inner bracket of an upper mount insulator which has its outer bracket fixed to the vehicle body. An annular piezoelectric sensing element is coupled with the piston rod and set in position by tightening a nut for fixedly coupling the piston rod with the inner bracket of the upper insulator.

This known sensor arrangement using the piezoelectric sensing element has the following problems:

Initial stress to which the sensing element is subjected to is determined by a torque for tightening the nut. With this arrangement, the initial stress applied to the sensing element becomes substantially great. This causes a difficulty in enhancing the measurement accuracy since the maximum peak strain of the sensing element becomes excessively high. Further, since the sensing element is required to have a rigidity and strength high enough to withstand the substantial initial stress, it is difficult to increase a magnification of a strain relative to an input load. Thus, there is a limit to measurement accuracy. Regarding the rigidity and strength of the sensing element required, the sensing element must be rigid and strong enough to withstand an input load induced upon impact with a bound stop of the vibration isolation apparatus. Thus, enhancement of the measurement accuracy is hardly expected.

With this arrangement wherein the initial stress applied to the sensing element is determined by the nut tightening torque, since it is very difficult to control the nut tightening torque during the production line, a product-to-product variability of the initial stress of the sensing element occurs. There is a difference in thermal expansion between the sensing element and the piston rod, causing a variation in the nut tightening torque which in turn induces a variation in transmission of input load to the sensing element. Since the sensing element is coupled with the piston rod, the sensing element is inclined when the piston rod is subject to a bending moment or stress.

An object of the present invention is to provide a sensor arrangement of a vibration isolation apparatus which is free from the above-mentioned problems which are obstacles to enhancement of measurement accuracy.

SUMMARY OF THE INVENTION

The present invention proposes an arrangement wherein a sensing element elastically deforms as a radially extending portion of a vibration isolation apparatus elastically deforms upon application of input load to the apparatus.

According to the present invention, there is provided a vibration isolation apparatus adapted to be coupled between a first sprung member and a second unsprung member comprising:

a suspension member including an axially extending portion and a radially extending portion extending radially from said axially extending portion, said radially extending portion including an inner peripheral section and an outer peripheral section, said radially extending portion being elastically deformable upon application of a load on one of said inner and outer peripheral sections relative to the other;

an inner peripheral support associated with said radially inner peripheral section;

an outer peripheral support associated with said radially outer peripheral section; and a sensor including a generally annular sensor plate with a sensing element, said sensor plate having an outer peripheral portion on said outer peripheral support and an inner peripheral portion on said inner peripheral support.

DETAILED DESCRIPTION OF THE INVENTION

Figure 1:
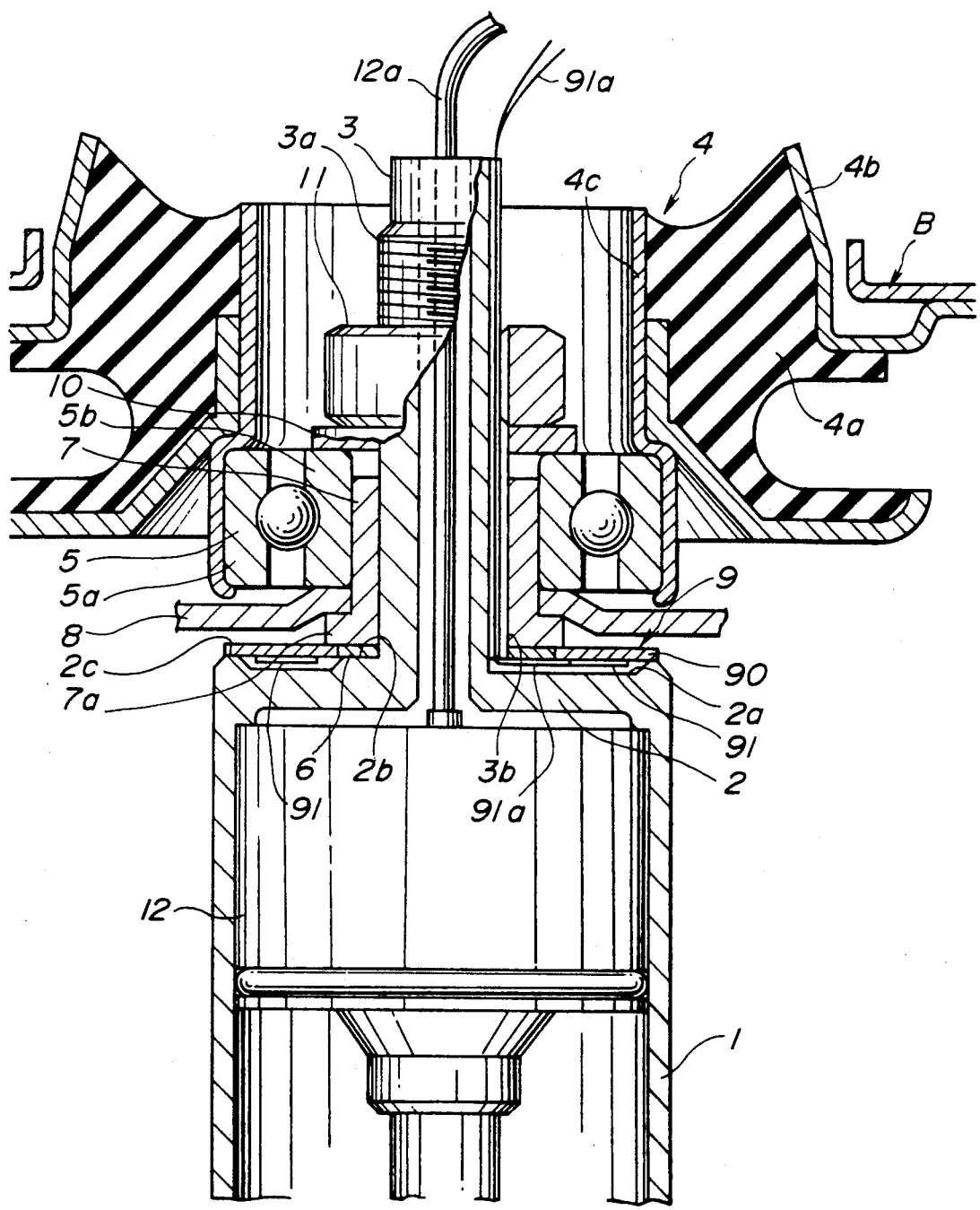
FIG. 1 is a fragmentary sectional view of a vibration isolation apparatus coupled in a force transmitting relationship between a vehicle front axle (a sprung member) and a vehicle body (an unsprung member)

Hereinafter, various embodiments according to the present invention are described in detail. Like reference numerals and characters are used throughout all of the Figures to denote like and similar parts and portions.

A first embodiment is described.

FIG. 1 is a fragmentary sectional view showing the first embodiment of a vibration isolation apparatus coupled between a first sprung member in the form of a vehicle front axle, and a second unsprung member in the form of the vehicle body B. The apparatus comprises a suspension member in the form of a cylinder 1 which is in direct force transmitting relationship with the vehicle body B and its piston rod in direct force transmitting relationship with the axle.

The cylinder 1 includes a radially extending portion, in the form of a closed axial end wall 2 of the cylinder 1, radially extending from an axially extending portion, in the form of a connection rod 3 extending axially from the closed end wall 2. The closed axial end wall 2 is formed with an annular groove 2a to define an inner peripheral annular section 2b and an outer peripheral annular section 2c.

The connection rod 3 is coupled to the vehicle body B via a mount insulator 4. Specifically, the mount insulator 4 includes an outer bracket 4b fixedly bolted to the vehicle body B, an inner bracket 4c, and an elastomer 4a disposed between the outer and inner brackets 4b and 4c. The inner bracket 4c is of the sleeve configuration. Fixedly coupled to the inner bracket 4c at its axial lower end, as viewed in FIG. 1, is an outer race 5a of a ball type bearing 5 having an inner race 5b through which the connection rod 3 extends. Disposed within the cylinder 1 is an actuator 12 for changing or controlling a damping force. A harness 12a connected to the actuator 12 extends through a central bore formed through the connection rod 3.

The connection rod 3 is fixedly coupled to the inner race 5b of the bearing 5 in the manner described hereinafter and thus the cylinder 1 is coupled to the vehicle body B in an axial force transmitting relationship with regard to the axially extending connection rod 3. Positioned in an annular clearance defined between an inner wall of the inner race 5b and the adjacent outer wall of the connection rod 3 is a sleeve-like bushing 7. The sleeve-like bushing 7 has an integral radially extending end flange 7a disposed between a centering washer 6 and an upper spring seat 8. The centering washer 6 is positioned between the inner peripheral section 2b and the end flange 7a. The upper spring seat 8 is positioned between a lower axial end of the inner race 5b (as viewed in FIG. 1) of the bearing 5 and the end flange 7a. Positioned between an upper axial end of the inner race 5b (as viewed in FIG. 1) and a nut 11 threadedly engaging the connection rod 3 at 3c is an upper spring seat 10.

Figure 4:
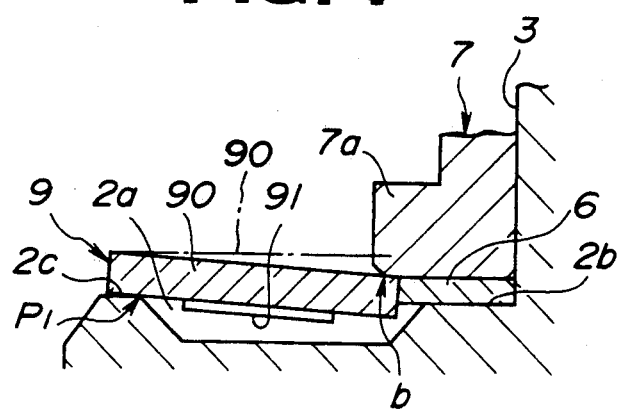
FIG. 4 is an enlarged view of a portion of FIG. 1 showing the manner in which an initial stress is applied to the sensor plate and in turn to the sensing element.

The end flange 7a radially extends further than the centering washer 6 does and serves as an inner peripheral support for a generally annular sensor plate 90 of a load sensor 9, as best seen in FIG. 4. The sensor plate 90 extends between the inner peripheral support on the end flange 7a and the outer peripheral section 2c which serves as an outer peripheral support. The sensor also includes strain sensing elements 91 bonded or affixed to the sensor plate 90. The strain sensing elements are well known and thus a detailed description is hereby omitted. They are connected to electric leads 91a which extend through an axially extending circumferential groove 3b with which the connection rod 3 is formed. In this manner, the electric leads 91a extend upwards through the mount insulator 4 to transmit information to a vehicle mount controller, not shown.

Figure 2:
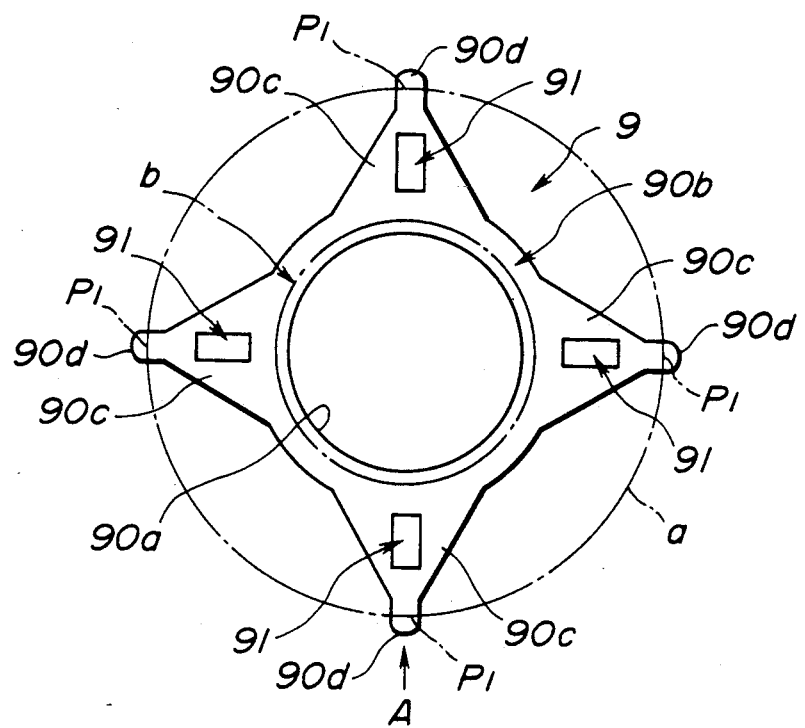
FIG. 2 is a bottom perspective view of a load sensor including a sensor plate with four sensing elements.
Figure 3:
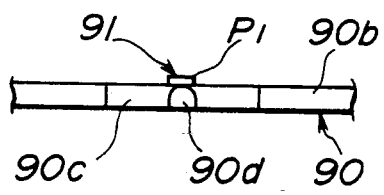
FIG. 3 is a fragmentary diagram viewing FIG. 2 in a direction of an arrow A.

Referring also to FIGS. 2 to 4, the load sensor 9 is further described. As shown in FIG. 2, the sensor plate 90 includes a continuous inner peripheral portion 90b formed with a central bore 90a receiving the centering washer 6, and four diametrically opposed radially extending beam portions 90c. The four beam portions 90c are spaced equi-distant circumferentially. Each of the four beam portions 90c is tapered and reduces its width at substantially a constant rate. The four beam portions 90c have radially outermost portions 90d which serve as an outer peripheral portion. As best seen in FIG. 3, each of the radially outermost portions 90d has a rounded profile, as viewed in FIG. 2 in a direction of an arrow A, which abuttingly engages the outer peripheral section 2c at its inner edge (at a support point $P_1$). In FIG. 2, the support points $P_1$ are disposed in an imaginary circle a. Four strain sensing elements 91 are bonded or affixed to the radially extending beam portions 90c, respectively, as shown in FIG. 2. Each of the strain sensing elements 91 lies at a center portion of the corresponding one of the radially extending beam portions 90c.

As best seen in FIG. 4, the sensor plate 90 is mounted with its radially outermost portions 90d supported on the outer peripheral section 2c and its continuous inner peripheral portions 90b supported on the inner peripheral support on the radially extending flange 7a. In FIG. 4, the phantom line shows an unstressed state of the sensor plate 90. In order to apply an initial stress to the sensor plate 90, a setting is made such that the thickness of the centering washer 6 is less than the thickness of the sensor plate 90. In other words, the inner peripheral support on the radially extending flange 7a is axially spaced from the inner peripheral section 2b by a distance that is less than the thickness of the sensor plate 90. It will be appreciated that an initial stress applied to the sensor body 90 can be easily changed by replacing the centering washer 6 with another one having a different thickness. In the position as illustrated in FIG. 4, since the inner peripheral portion of the sensor plate 90 is urged downwardly to cause the radially outermost portions 90d to lift upwardly relative to the inner peripheral portion, each of the radially extending beam portions 90c elastically deforms upwardly and thus each of the strain sensing elements 91 is subject to an initial tensile stress.

Referring particularly to FIGS. 2 and 4, it is readily seen that the sensor element 90 has an inner peripheral portion resting on the inner peripheral support formed on the radially extending flange 7a at points interconnected by a phantom circle b and an outer peripheral portion resting on the outer peripheral section 2c at its inner edge (see FIG. 4) at points interconnected by a phantom circle a.

The operation of the first embodiment is as follows:

With the first embodiment of the apparatus, the strain sensing elements 91 of the load sensor 9 are subject to the initial tensile stress. Thus, this initial tensile stress is measured and used as a reference value.

Let us now assume that the vibration isolation apparatus is subject to a compression load. In this case, the closed axial end wall 2 elastically deforms such that the outer peripheral section 2c is elevated in the axial direction relative to the inner peripheral section 2b (see FIG. 4). Thus, each of the radially extending beam portions 90 increases a degree of its elastic deformation, causing an increase in tensile stress to which the corresponding strain sensing element 91 is subjected. As a result, the measured value of the tensile stress becomes greater than the reference value, and a positive sign and a magnitude of a deviation of the measured value from reference value are indicative of a direction of an input load as being upward and a strength of the input load.

Let us assume that the vibration isolation apparatus is subject to a tensile load. In this case, the outer peripheral section 2c moves downwardly (as viewed in FIG. 4) relative to the inner peripheral section 2b. Each of the radially extending beam portions 90 decreases a degree of its elastic deformation, causing a decrease in tensile stress to which the corresponding strain sensing element 91 is subjected. As a result, the measured value of the tensile stress becomes less than the reference value, and a negative sign and a magnitude of a deviation of the measured value from the reference value are indicative of a direction of an input load as being downward and a strength of the input load.

From the preceding description of the first embodiment, it is seen that, with a single load sensor 9, an input load directed from the sprung member to the unsprung member and an input load directed from the unsprung member to the sprung member can be measured in a quantitative manner.

From the preceding description of the first embodiment, it is seen that an initial stress to which the load sensor 9 is subjected is determined by a relation of the thickness of the centering washer 6 to the thickness of the sensor plate 90 and thus regardless of a force for tightening the nut 11. Thus, the initial stress to which the load sensor 9 is subjected can be minimized, suppressing the maximum peak strain of the load sensor 9, resulting in an increased accuracy of measurment.

This accuracy is further increased owing to the use of a load sensor 9 of a reduced rigidity and strength. It is now possible to use such load sensor 9 of the reduced rigidity and strength because a load due to an impact with a bound stop has less influence on the load sensor 9 and no great initial stress is applied to the load sensor 9. The accuracy of measurement is enhanced since a magnification of a strain relative to an input load is increased.

A change in the nut tightening torque caused by a change in temperature has little influence on a stress to which the load sensor 9 is subjected.

Since the initial stress applied to the load sensor 9 is determined due to a difference in thickness between the sensor plate 90 and the centering washer 6, a production-to-production variability of the initial load is minimized and the subsequent adjustment to assembly becomes unnecessary, resulting in increased productivity.

If the outer peripheral section 2c is inclined upon application of a bending stress or moment to the axially extending connection rod 3 from the upper insulator 4, the sensor plate 90 stays in contact with the outer peripheral section 2c since it contacts with the outer peripheral section 2c at four different points $P_1$. If the strain sensing elements 91 bonded to the diametrically opposed radially extending beam portions 90c are used in a Wheatstone bridge circuit, an axial load can be measured with good accuracy with or without the presence of the bending stress.

As best seen in FIG. 3, each of the radially outermost portions 90d is rounded and abuts on the outer peripheral portion 2c at its inner edge (support point $P_1$). With this construction, the sensor plate 90 is not affected by a lateral force in the radial direction.

When it elastically deforms, each of the beam portions 90c shows a curvature in a radial direction which changes at the same rate since it is tapered toward the support point $P_1$. Even if there is a deviation in location of the strain sensing element 91 in the radial direction of the beam portion 90c, there occurs no deviation in measurement result. Thus, no skilled labour is required in bonding the strain sensing elements 91 on the beam portions 90c.

Figure 5:
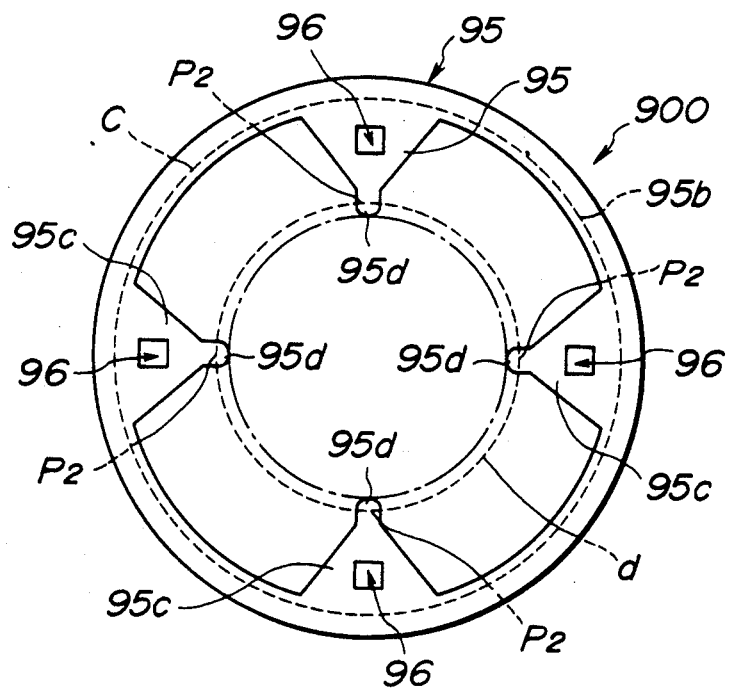
FIG. 5 is a similar view to FIG. 2 showing a load sensor used in a second embodiment.
Figure 6:
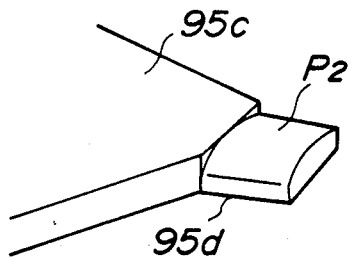
FIG. 6 is an enlarged perspective view of a portion of the load sensor shown in FIG. 5.
Figure 7:
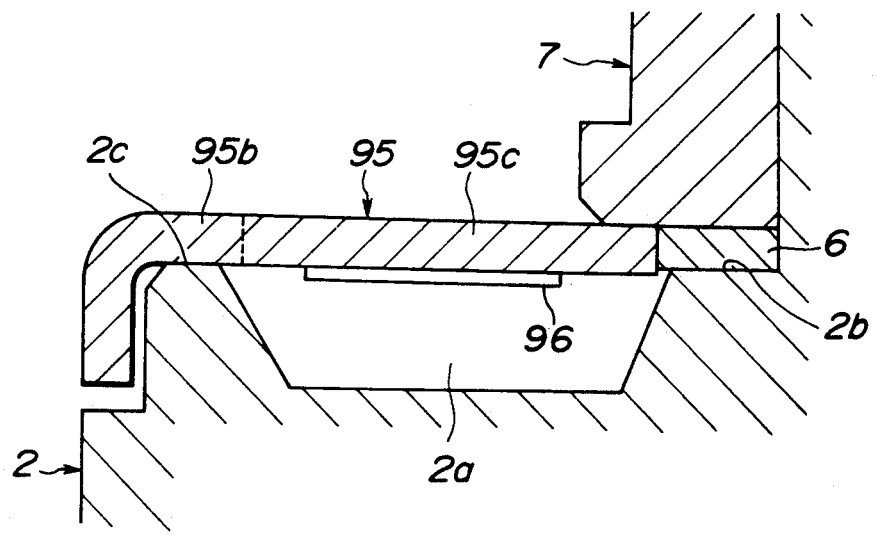
FIG. 7 is a similar view to FIG. 4 showing the manner in which an initial stress is applied to the sensor plate and in turn to the sensing element shown in FIG. 5.

Referring to FIGS. 5 to 7, a second embodiment is described.

This second embodiment is substantially the same as the first embodiment except the configuration of a load sensor which is generally denoted by a reference numeral 900. The load sensor 900 of the second embodiment is different from the load sensor 90 in that the continuous peripheral portion defines an outer periphery and each of the beam portions is tapered from the outer periphery toward an inner periphery.

The load sensor 900 of this second embodiment comprises a generally annular sensor plate 95. The sensor plate 95 includes the continuous outer peripheral portion 95b, and four diametrically opposed radially extending beam portions 95c. The four beam portions 95c are spaced equi-distant circumferentially. Each of the four beam portions 95c are tapered and reduces its width at substantially a constant rate. The four beam portions 95c have radially innermost portions 95d which serve as an inner peripheral portion. As best seen in FIG. 6, each of the radially innermost portions 95d has a rounded profile which abuttingly engages a downwardly facing wall of a radially extending end flange 7a of a bushing 7 (at a support point $P_2$). Four strain sensing elements 96 are bonded or affixed to the radially extending beam portions 95c, respectively, as shown in FIG. 5. Each of the strain sensing elements 96 lies at a center portion of the corresponding one of the radially extending beam portions 95c.

As best seen in FIG. 7, the sensor plate 95 is mounted with its continuous outer peripheral portion 95d in abutting engagement with an outer peripheral support on an outer peripheral section 2c of a radially extending portion in the form of a cylinder end wall 2 and its radially innermost portions 95d with the radially extending end flange 7a of the bushing 7. In order to apply an initial stress to the sensor plate 95, the setting is made such that the thickness of a centering washer 6 is less than the thickness of the sensor plate 95. In the position as illustrated in FIG. 7, since the innermost portions 95d of the radially extending beam portions 95c are urged downwardly, each of the radially extending beam portions 95c elastically deforms downwardly and each of the strain sensing elements 96 is subject to an initial compression stress.

It is now seen that the sensor plate 95 has an inner peripheral portion engaging the radially extending flange 7a at points $P_2$ interconnected by a phantom line d and an outer peripheral portion abuttingly engaging the outer peripheral section 2c at points interconnected by a phantom circle c.

With the second embodiment of the apparatus, the strain sensing elements 96 of the load sensor 900 are subject to the initial compression stress. Thus, this initial compression stress is measured and used as a reference value.

Let us now assume that the second embodiment of the vibration isolation apparatus is subjected to a compression load. In this case, the closed axial end wall 2 elastically deforms such that the outer peripheral section 2c is elevated in the axial direction relative to the inner peripheral section 2b (see FIG. 7). Thus, each of the radially extending beam portions 95 increases a degree of its elastic deformation, causing an increase in compression stress to which the corresponding strain gage 96 is subjected. As a result, the measured value of the compression stress becomes greater than the reference value, and a positive sign and a magnitude of a deviation of the measured value from the reference value are indicative of a direction of an input load as being upward and a strength of the input load.

Let us assume that this vibration isolation apparatus is subjected to a tensile load. In this case, the outer peripheral section 2c moves downwardly (as viewed in FIG. 7) relative to the inner peripheral section 2b. Each of the radially extending beam portions 95 decreases a degree of its elastic deformation, causing a decrease in compression stress to which the corresponding strain sensing element 96 is subjected. As a result, the measured value of the compression stress becomes less than the reference value, and a negative sign and a magnitude of a deviation of the measured value from the reference value are indicative of a direction of an input load as being downward and a strength of the input load.

According to the first and second embodiments, it is seen that the inner peripheral support formed on the downwardly facing wall of the radially extending portion 7a of the bushing 7 and the outer peripheral support formed on the outer peripheral section 2c are disposed on that side of the radially extending portion 2 which is near the unsprung member B.

Figure 8:
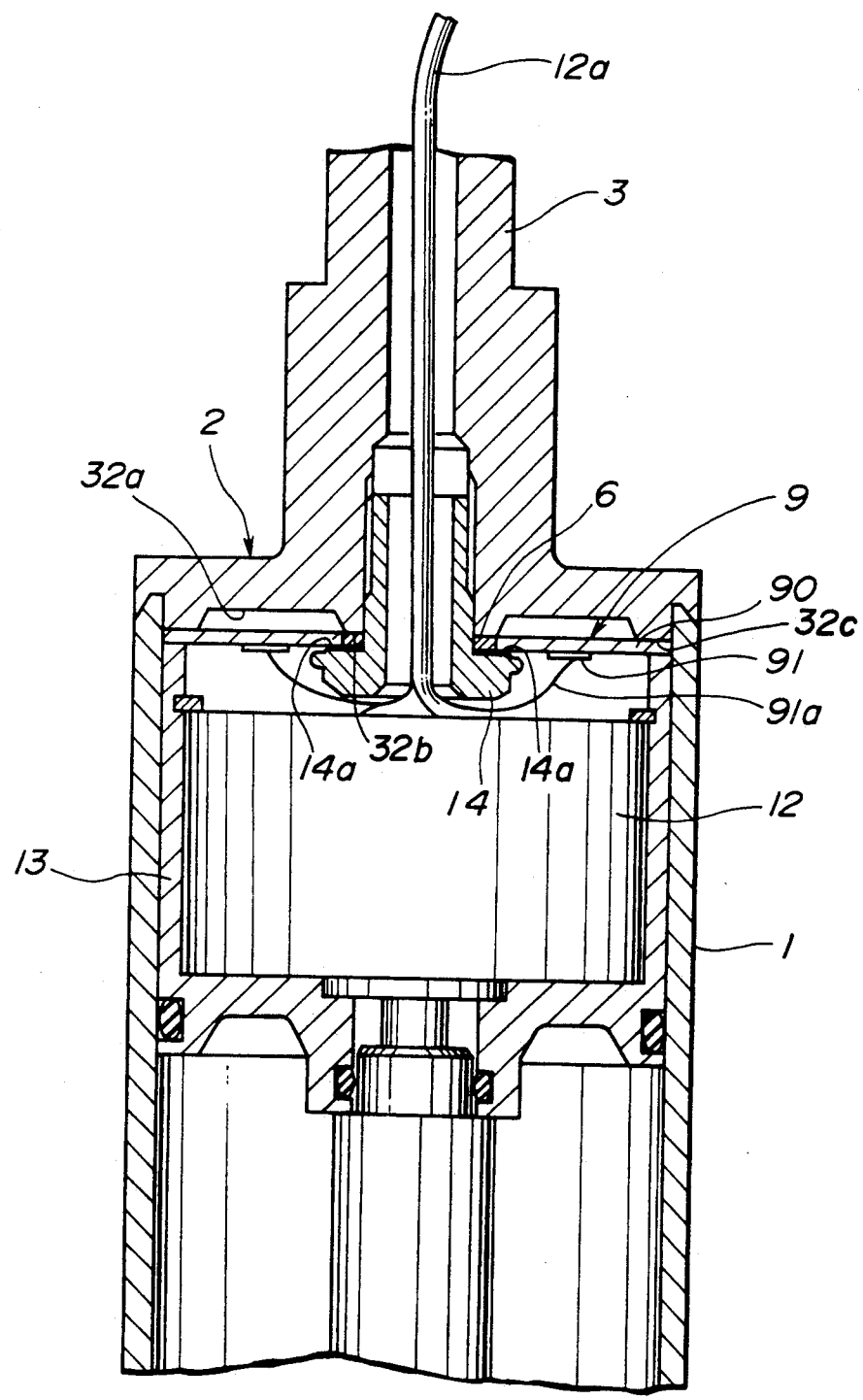
FIG. 8 is a similar view to FIG. 1 showing a third embodiment.

Referring to FIG. 8, a third embodiment is described. This third embodiment is substantially the same as the first embodiment except the arrangement of inner and outer peripheral supports and a load sensor relative to a radially extending portion of a suspension member.

Figure 9:
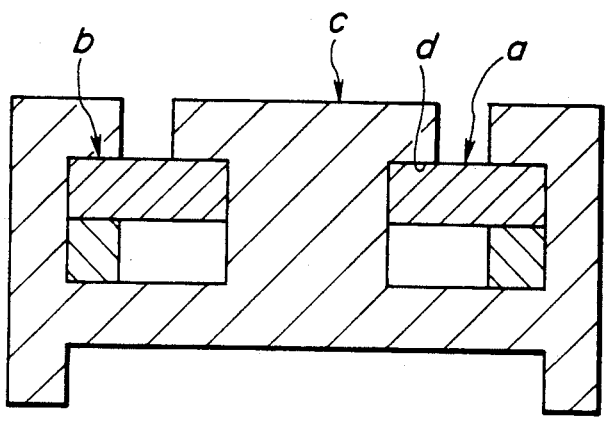
FIG. 9 is a diagram illustrating a fourth embodiment.

As shown in FIG. 8, the radially extending portion in the form of a closed axial end wall 2 of a cylinder 1 is formed with an annular groove 32a to define an inner peripheral annular section 32b and an outer peripheral annular section 32c. As different from the first embodiment, the annular groove 32a, inner peripheral section 32b, and outer peripheral section 32c face a bore of the cylinder 1 and define an end wall of the cylindrical bore. Disposed within this cylindrical bore of the cylinder 1 is a casing 13 receiving therein an actuator 12, and a hollow bolt 14 threadedly engaging a central bore with which an axially extending connection rod 3 is formed. The bolt 14 has a radially extending head portion. Between this head portion of the bolt and the inner peripheral section 32b is a centering washer 6. The head portion of the bolt 14 extends radially outwardly further than the centering washer 6 does to define an inner peripheral support 14a. A load sensor 9 is substantially the same as that used in the first embodiment and includes a generally annular sensor plate 90 with four elastically deformable radially extending beam portions having strain sensing elements 91 bonded thereto, respectively. The sensor plate 90 includes a continuous inner peripheral portion in abutting engagement with the inner peripheral support 14a and radially outermost portions of the four radially extending beam portions interposed between the outer peripheral section 32c and axial extending portion of the casing 13. The relationship in thickness between the centering washer 6 and the sensor body 90 is the same as that of the first embodiment. In the position as shown in FIG. 9, the inner peripheral portion of the sensor plate 90 is urged upwardly into the annular groove 32a so that the outermost portions of the four radially extending beam portions elastically deform downwardly to apply an initial compression stress to the strain sensing elements 91. According to this third embodiment, the degree of the elastic deformation decreases upon application of input load from the sprung member.

In the third embodiment just described, the inner peripheral support 14a is not integral with the suspension member 2. Alternatively, the inner peripheral support may be integral with the suspension member. This alternative is briefly described in connection with a fourth embodiment shown in FIG. 9.

Referring to FIG. 9, radially outermost portions of a generally annular sensor plate a are interposed at b in the same manner as in the third embodiment and a suspension member c is formed with an inner peripheral support d. Thus, an inner peripheral portion of the sensor plate a is held in abutting engagement with the inner peripheral support of the suspension member c. With this construction, the sensor plate a elastically deforms together with deformation of the radially exctending portion of the suspension member c. In this fourth embodiment, the sensor plate a elastically deforms upon application of load to the suspension member from a sprung member.

Figure 10:
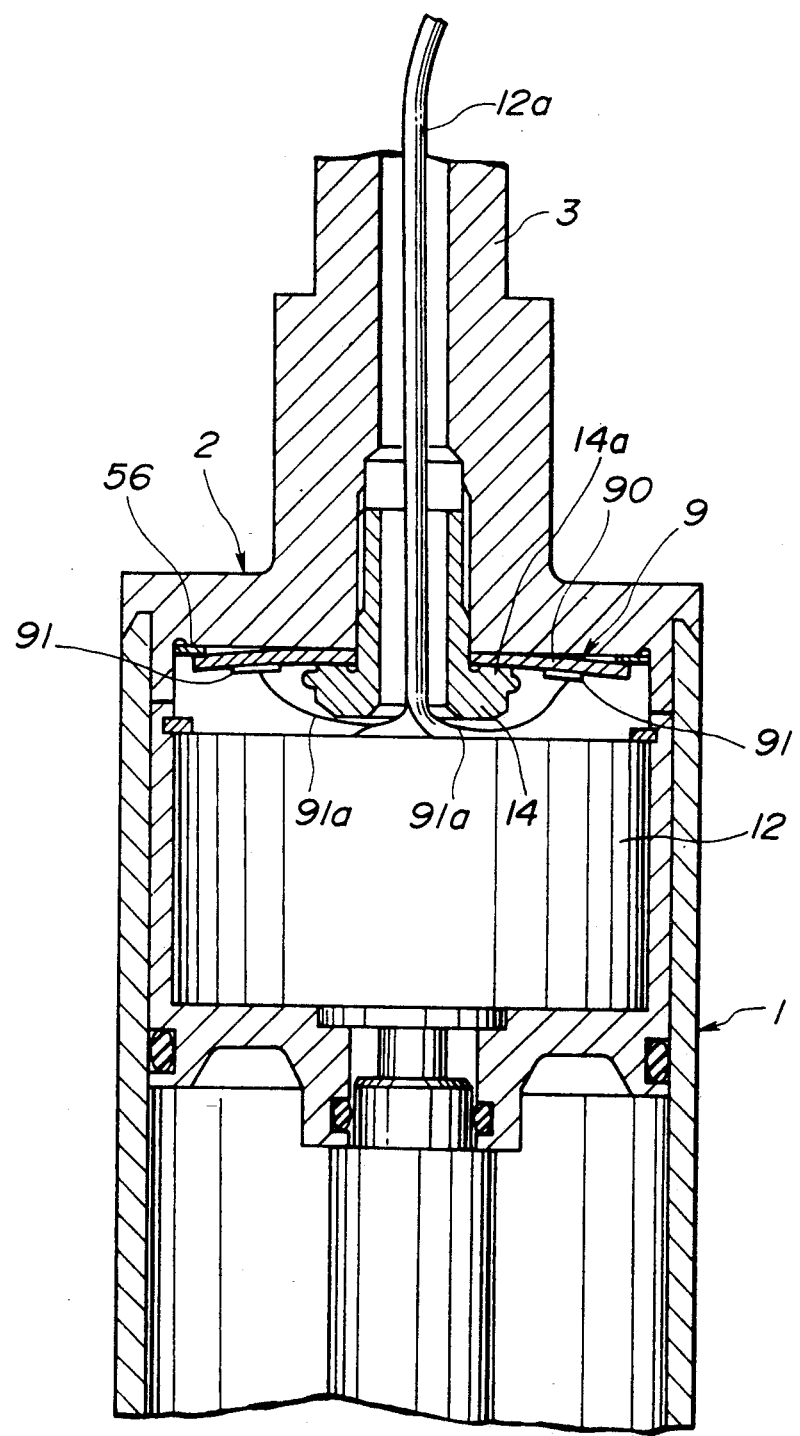
FIG. 10 is a similar view to FIG. 1 showing a fifth embodiment.

Referring to FIG. 10, a fifth embodiment is described.

This fifth embodiment is similar to the previously described third embodiment shown in FIG. 8. However, this embodiment is different from the third embodiment in that a generally annular sensor plate 90 has an inner peripheral portion interposed between a radially extending head portion of a bolt 14 and the adjacent opposed inner peripheral section of a radially extending portion 2 of a suspension member 1 and outermost peripheral portions in abutting engagement with a washer 56 placed on an outer peripheral section of the radially extending portion 2. With this arrangement, an initial stress is applied to the sensor plate 90 due to the thickness of the washer 56 relative to that of the sensor plate 90. In this fifth embodiment, the initial stress applied to the sensor plate 90 is reduced upon application of input load to the suspension member 1 from the sprung member.

Figure 11:
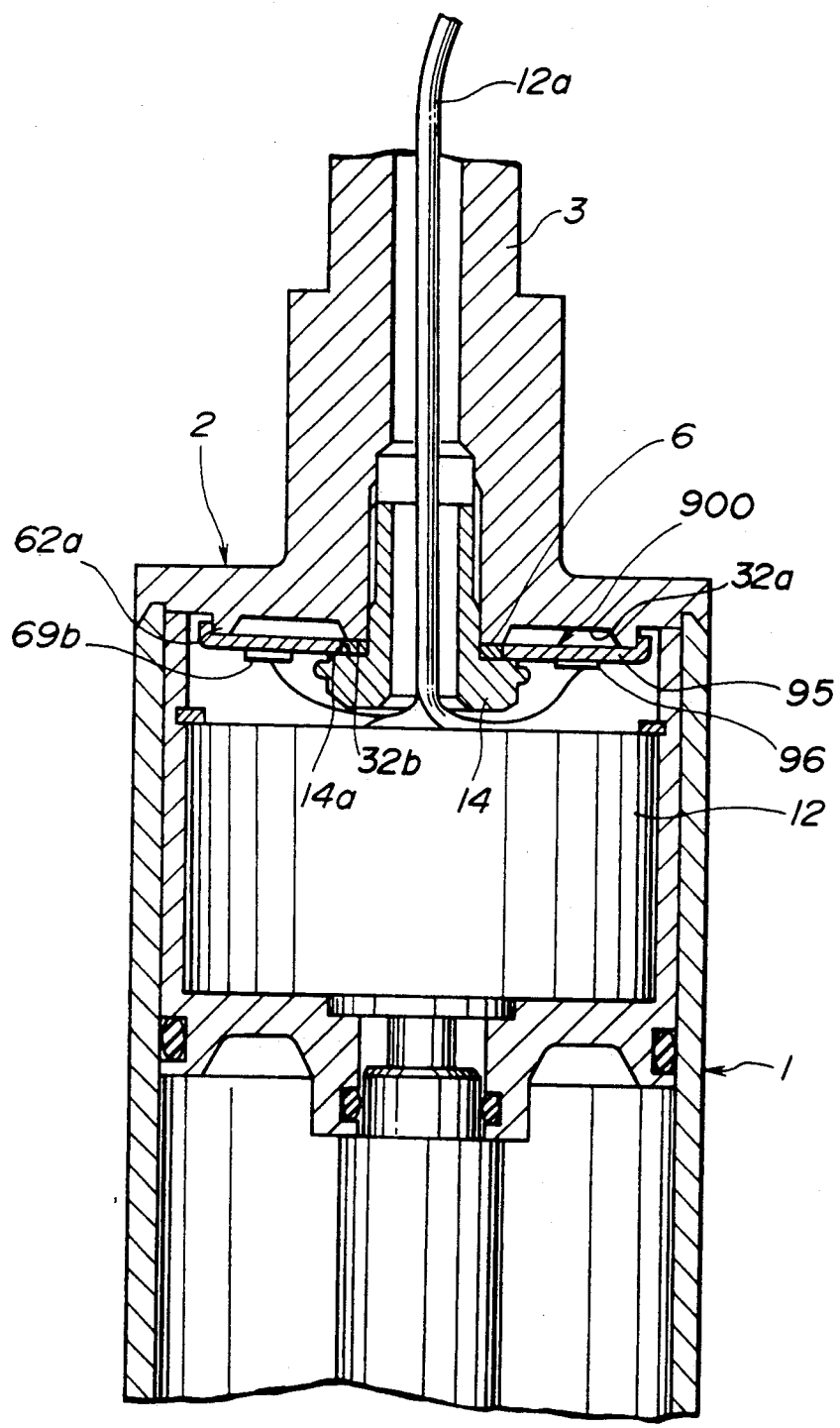
FIG. 11 is a similar view to FIG. 1 showing a sixth embodiment.

Referring to FIG. 11, a sixth embodiment is described. This embodiment is substantially the same as the third embodiment shown in FIG. 8 except that a load sensor 900 used in the second embodiment shown in FIGS. 5 to 7 is used. As shown in FIG. 11, the radially extending portion in the form of a closed axial end wall 2 of a cylinder 1 is formed with an annular groove 32a to define an inner peripheral annular section 32b and an outer peripheral annular section 62a. The load sensor 900 includes a generally annular sensor plate 95 which has a continuous outer peripheral portion and radially innermost portions of four radially extending beam portions (see FIG. 5). The continuous outer peripheral portion of the sensor plate 95 is in abutting engagement with an outer peripheral support formed on the outer peripheral annular section 62a and the radially innermost portions of the sensor plate 95 are in abutting engagement with an inner peripheral support 14a formed on the radially extending head portion of a hollow bolt 14. Since the thickness of a washer 6 is less than the thickness of the sensor plate 95, an initial stress is applied to the sensor plate 95. In this embodiment, this initial stress applied to the sensor plate 95 decreases upon application of an input load to the suspension member 1 from the sprung member.

In the preceding description, the present invention has been specifically described in connection with the various different embodiments. The present invention is not limited to these embodiments.

In the described embodiments, the suspension member is in the form of the cylinder 1 having an outer peripheral section of a radially extending portion 2 in direct force transmitting relationship with the sprung member and an inner peripheral section of the radially extending portion 2 in direct force transmitting relationship with the unsprung member B. According to the present invention, it is possible to use a suspension member having an outer peripheral section in direct force transmitting relationship with the unsprung member and an inner peripheral section in direct force transmitting relationship with the sprung member. This is specifically described in connection with FIGS. 12 and 13.

Figure 12:
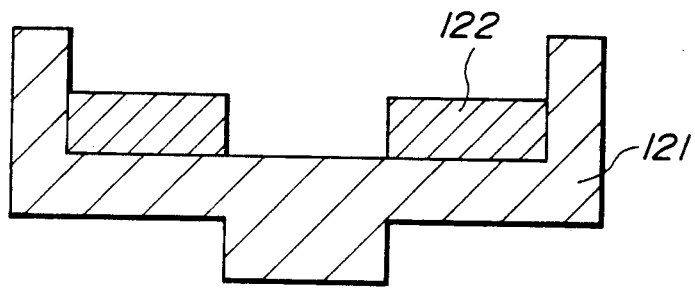
FIG. 12 is a diagram illustrating a modification.

Referring to FIG. 12, the reference numeral 121 denotes a suspension member having an outer peripheral section in direct force transmitting relationship with an unsprung member in the form of a vehicle body and an inner or central section in direct force transmitting relationship with a sprung member in the form of a vehicle wheel axle. Denoted by the reference numeral 122 is an annular sensor body of a load sensor. As viewed in FIG. 12, the sensor body 122 is mounted on the side of the suspension member 121 which is disposed near the unsprung member.

Figure 13:
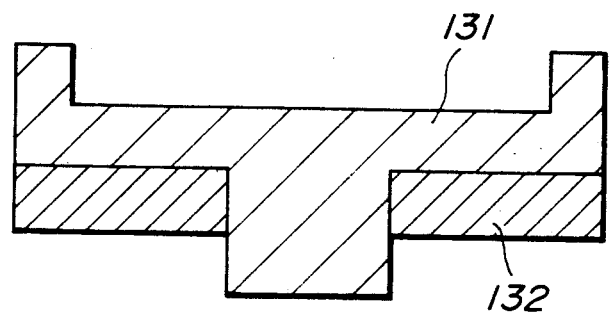
FIG. 13 is a diagram illustrating another modification.

Referring to FIG. 13, the reference numeral 131 denotes a suspension member having an outer peripheral section in direct force transmitting relationship with an unsprung member in the form of a vehicle body and an inner or central section in direct force transmitting relationship with a sprung member in the form of a vehicle wheel axle. Denoted by the reference numeral 132 is an annular sensor body of a load sensor. As viewed in FIG. 13, the sensor body 132 is mounted on the side of the suspension member 121 which is disposed near the sprung member.

The suspension member has been described as being in the form of a cylinder of the type having its piston rod extending downwardly. The suspension member may have the form of a cylinder of the type having its piston rod extending upwardly. The suspension member to which the present invention may be applied includes a damper or an apparatus used in vehicle height control.

The present invention is applied to a vibration isolation apparatus to control the transmission of vibration between the vehicle body and the front axle. The present invention may instead be applied to a vibration isolation apparatus designed to control the transmission of vibration between the vehicle body and the rear axle. In the latter type of vibration isolation apparatus, it would not be necessary to mount a connection rod for relative rotation to a mount insulator.

What is claimed is:

1. An arrangement for a load sensor provided near a vibration isolation apparatus employed in a shock absorber disposed between a sprung member and an unsprung member, comprising:

a suspension member including an axially extending portion and a radially extending portion extending from said axially extending portion, said radially extending portion including an inner peripheral section and an outer peripheral section, said radially extending portion being elastically deformable upon application of a load on one of said inner and outer peripheral sections relative to the other;

an inner peripheral support associated with said radially inner peripheral section;

an outer peripheral support associated with said radially outer peripheral section;

a sensor unit including a substantially annular sensor plate and at least one sensing element for monitoring an axial deflection of said sensor plate, said sensor plate having an outer peripheral portion on said outer peripheral support and an inner peripheral portion on said inner peripheral support, said sensor plate being deflected with deflection of said radially extending portion; and one of said inner and outer peripheral supports permitting said axial deflection of said sensor plate while preloading said sensor plate so as to provide a designated initial deflection of said sensor plate.

2. A vibration isolation apparatus as claimed in claim 1, wherein said inner and outer peripheral sections of said radially extending portion of said suspension member are in force transmitting relationship with the second unsprung member and the first sprung member, respectively, and wherein said inner and outer peripheral supports are disposed on a side of said radially extending portion of said suspension member which is closest to the second unsprung member.

3. A vibration isolation apparatus as claimed in claim 1, wherein said inner and outer peripheral sections of said radially extending portion of said suspension member are in force transmitting relationship with the second unsprung member and the first sprung member, respectively, and wherein said inner and outer peripheral supports are disposed on a side of said radially extending portion of said suspension member which is closest to the first sprung member.

4. A vibration isolation apparatus as claimed in claim 1, wherein said inner and outer peripheral sections of said radially extending portion of said suspension member are in force transmitting relationship with the first sprung member and the second unsprung member, respectively, and wherein said inner and outer peripheral supports are disposed on a side of said radially extending portion of said suspension member which is closest to the second unsprung member.

5. A vibration isolation apparatus as claimed in claim 1, wherein said inner and outer peripheral sections of said radially extending portion of said suspension member are in force transmitting relationship with the first sprung member and the second unsprung member, respectively, and wherein said inner and outer peripheral supports are disposed on a side of said radially extending portion of said suspension member which is closest to the first sprung member.

6. A vibration isolation apparatus as claimed in claim 1, wherein said inner and outer peripheral supports support the opposite sides of said sensor plate, respectively, such that said sensor plate elastically deforms as said radially extending portion elastically deforms.

7. A vibration isolation apparatus as claimed in claim 1, wherein said inner and outer peripheral supports support the opposite sides of said sensor plate, respectively, such that said sensor plate decreases a degree of deformation thereof as said radially extending portion elastically deforms.

8. A vibration isolation apparatus as claimed in claim 1, wherein said inner peripheral portion of said sensor plate is interposed between said inner peripheral section of said radially extending portion and said inner peripheral support, and said outer peripheral portion of said sensor plate is supported by said outer peripheral support such that said sensor plate elastically deforms as said radially extending portion elastically deforms.

9. A vibration isolation apparatus as claimed in claim 1, wherein said inner peripheral portion of said sensor plate is interposed between said inner peripheral section of said radially extending portion and said inner peripheral support, and said outer peripheral portion of said sensor plate is supported by said outer peripheral support such that said sensor plate decreases a degree of deformation thereof as said radially extending portion elastically deforms.

10. A vibration isolation apparatus as claimed in claim 1, wherein said outer peripheral portion of said sensor plate is interposed between said outer peripheral section of said radially extending portion and said outer peripheral support, and said inner peripheral portion of said sensor plate is supported on said outer peripheral support such that said sensor plate elastically deforms together with elastic deformation of said radially extending portion.

11. A vibration isolation apparatus as claimed in claim 1, wherein said outer peripheral portion of said sensor plate is interposed between said outer peripheral section of said radially extending portion and said outer peripheral support, and said inner peripheral portion of said sensor plate is supported on said inner peripheral support such that said sensor plate decreases a degree of deformation thereof as said radially extending portion elastically deforms.

12. A vibration isolation apparatus as claimed in claim 1, wherein one of said inner and outer peripheral supports is axially spaced from the corresponding one of said inner and outer peripheral sections of said radially extending portion by a distance that is less than a thickness of said sensor plate.

13. A vibration isolation apparatus as claimed in claim 1, wherein one of said inner and outer peripheral supports is positioned by a washer.

14. A vibration isolation apparatus as claimed in claim 1, wherein said sensor plate includes a continuous ring portion and diameterically opposed radially extending beam portions extending from said continuous ring portion.

15. A vibration isolation apparatus as claimed in claim 14, wherein each of said radially extending beam portions of said sensor plate are tapered.

16. An arrangement for a load sensor mounted on a cylinder end of a fluid-operated actuator employed in an automotive suspension system disposed between a sprung member and an unsprung member, said cylinder end being formed with an axially extending center rod secured on one of said sprung and unsprung members, comprising:

a load-sensing wall formed on said cylinder end in a manner so as to extend radially from said rod to an outer peripheral section of said cylinder end, said load-sensing wall being elastically deflectable in accordance with a relative displacement created between said rod and said outer peripheral section of said cylinder end, based on tensile load or compressive load applied to said fluid-operated actuator;

a substantially annular sensor plate mounting thereon at least one sensing element for monitoring an axial deflection of said sensor plate, said sensor plate being deflected with deflection of said load-sensing wall;

first supporting means provided on said load-sensing wall, for supporting one of inner and outer peripheries of said sensor plate;

second supporting means associated with said load-sensing wall, for supporting the other periphery of said sensor plate while preloading said sensor plate so as to provide a designated initial deflection of said sensor plate and providing an aperture permitting the deflection of said sensor plate.

17. The load sensor arrangement as set forth in claim 16, wherein said load-sensing wall is symmetrically formed to radially extend from said rod and said sensor plate includes a circumferentially extending continuous ring portion at one periphery and at least one pair of diametrically opposed beam portions at the other periphery, which beam portions extend radially from said continuous ring portion.

18. The load sensor arrangement as set forth in claim 17, wherein said sensing element is attached to each of said beam portions.

19. The load sensor arrangement as set forth in claim 18, wherein each beam portion has a sectorial section fanned out towards said continuous ring portion with a designated constant fanned-out rate to permit said beam portion to deflect with an identical curvature with respect to a deflection curve taken in a radial direction of said sensor plate.

20. The load sensor arrangement as set forth in claim 19, wherein said sensor plate is comprised of a circumferentially extending continuous ring portion at one periphery and two pairs of diametrically opposed beam portions at the other periphery and said sensing elements comprise four strain gauges respectively attached to the two pairs of beam portions for constructing a Wheatstone bridge to compensate the deflection of said sensor plate upon application of a lateral load other than a longitudinal load which includes said tensile load and compressive load acting in the axial direction of said fluid-operated actuator.

* * * * *